D. McLAREN.
PIPE-TONGS.

No. 181,701.　　　　　　　　　　Patented Aug. 29, 1876.

Witnesses:

Inventor:
Duncan McLaren

UNITED STATES PATENT OFFICE.

DUNCAN McLAREN, OF BROOKLYN, NEW YORK.

IMPROVEMENT IN PIPE-TONGS.

Specification forming part of Letters Patent No. 181,701, dated August 29, 1876; application filed July 8, 1876.

*To all whom it may concern:*

Be it known that I, DUNCAN MCLAREN, of the city of Brooklyn, county of Kings and State of New York, have invented a new and useful Improvement in Pipe-Tongs, which improvement is fully set forth in the following specification, reference being had to the accompanying drawing.

The object of my invention is to produce pipe tongs or wrenches for gas-fitters' and other like use, capable of operating upon pipes of several different sizes, without special modification and adjustment for the particular size, by the combination of the large curved hook provided with a V, and the lever toothed on its outward edge, as shown in the several figures in the accompanying drawing.

Figure 1:
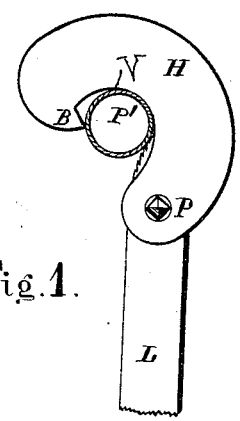

The tongs are composed of the lever L and hook H, shown in Fig. 1, engaging a pipe. The lever has on the edge of its forward end, which faces away from the body of the hook, a curved and toothed surface, T, the teeth being made small enough at the extreme end to engage, as to at least two of them, with the smallest-size pipe intended to be operated upon.

The teeth increase in size backward from the extreme end according to the size of the pipe, making contact at any given point by two or more teeth with the pipe. This arrangement of the teeth as to size increases the gripe and efficiency of the tool, although teeth of small and uniform size would operate fairly well.

The back edge of the lever L opposite the hook-body presents a plain surface, which is opposed to or looks toward the body of the hook, and has no griping function to perform. It curves backward toward its extreme end on a gentle curve, as shown at C, for the purpose of permitting the point of the lever to drop backward into the slot S of the hook, and consequently giving sufficient clearance between the toothed edge of the lever and the bill B of the hook for the entrance of the pipe P′ to its seat for engagement, especially of the largest size. It may be that, if this back edge should be made straight instead of curved, the point of the lever would have metal enough, and be strong enough for all ordinary purposes; but I prefer the shape of the lever as described, in order to insure a strong and durable tool. In case the back edge should be made thus straight, of course the slot S in the hook might be in so much filled up and made solid, even to closing it with a thin film of metal; but there must still be provided a recess or cut in the hook to receive the point of the lever, as the slot S is intended to do, and for the same purpose—viz., to give room to admit pipe of larger size to the V.

The lever L has a pin, P, located a proper distance back of the hither end of the toothed surface, by which the hook H and lever L are held strongly together. The lever should be of a length and strength proportioned to the work required of it, and best of steel.

The hook H is large, and sweeps in a large curve around the point of the lever, so as to present its bill B and its V to the outward edge of the lever. It has, just back of the bill B, the usual V, or pipe-seat V, and is suitably shaped to receive the several sizes of pipe intended to be operated upon, and engage them at two points.

Figure 2:
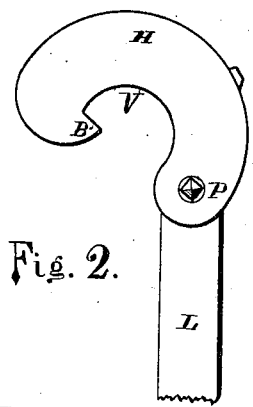
Figure 3:
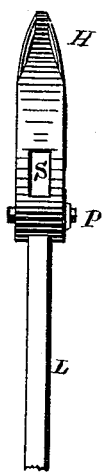
Figure 4:
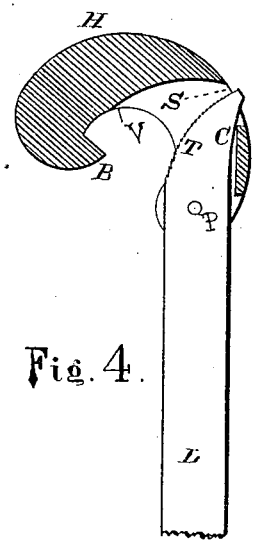

The hook H may be made of steel, cast, and from its rear end forward is grooved so as to receive the whole width of the lever lengthwise therein. At its forward end this groove becomes a slot, S, and is cut entirely through the back of the hook far enough to permit the curved rear point of the lever to pass through the same, as shown in Fig. 2, when wide open. Back of the slot S, the rear edge of the hook is solid, to give strength and a rest or stop for the lever, except opposite the pin P, and the point of attachment to the lever, (see Fig. 3,) where it is cut through far enough to permit free motion of the hook and lever into contact between the bill B and the toothed surface T. (See Fig. 4.) The pipe-seat V is placed near the extreme end of the hook H, and the movement of the toothed surface T is outward and toward it, in the act of engagement with the pipe; whereas it has hitherto been the practice in this class of pipe-tongs to move the toothed surface inward toward the pipe, the pipe-seat, and the body of the hook, one effect of which is to require either a sharp curve to the toothed surface, a sharp-edged bill in its place, or a short hook of limited capacity, in all of which cases the range of possible sizes of pipe is limited. In all such cases, when the toothed lever is used, it is placed on the edge of the lever corresponding to the back of my lever, and the sharp-edged bill, when used, is similarly located.

I claim as my invention—

1. The pipe-tongs, lever L, having on its outer and forward edge the toothed surface T, and on its inner forward and plain edge the surface C, opposed to the body of the hook, as shown and described.

2. The hook H, provided with the V and the slot S, and the lever L, provided with the toothed surface T, opposed to the V of the hook, and the surface C opposed to the body of the hook, in combination.

DUNCAN McLAREN.

Witnesses:
A. P. BALES,
J. A. SKILTON.